3,672,881
METHOD OF MAKING POWDER COMPOSITES
John J. Sowko, Sr., Bethel Park, Pa., assignor to
Carmet Company, Pittsburgh, Pa.
No Drawing. Filed Nov. 3, 1969, Ser. No. 873,698
Int. Cl. B22f 7/06
U.S. Cl. 75—208 R                    10 Claims

ABSTRACT OF THE DISCLOSURE

Described herein is a method of making a composite article of powdered metal and a refractory hard metal component which involves forming a green compact of powder metal and sintering the compact in contact with the refractory hard metal component to metallurgically bond the two.

---

The carbides, nitrides, silicides, etc., of refractory metals, such as tungsten and titanium, possess very attractive properties for a number of applications where strength and hardness are important. These materials, although non-metallic compounds, are known to the art as "refractory hard metals." They include the carbides, nitrides, silicides of titanium, tungsten, zirconium, and other refractory metals.

It is frequently necessary in manufacturing articles of refractory hard metals to attach them to a metal component. Since these materials cannot be welded, various mechanical and chemical techniques have been developed for this purpose. Among the practices used are clamping, brazing, and other mechanical attachments.

Many manufacturing practices do not lend themselves to brazing, particularly when a refractory hard metal is to be brazed to metals. This is primarily due to the vast difference in the coefficient of expansion between the refractory hard metal and the metal members to which they are to be joined. As an illustration, most metals expand approximately twice as much as tungsten carbide at elevated temperatures. Thus, after brazing, the tungsten carbide part is unduly strained and susceptible to cracking.

The present invention enables powdered metal compacts to be bonded to refractory hard metal components with a minimum of strain or warpage to either part. It thus eliminates the need for brazing. In accordance with the invention there is provided a method of making a composite article by pressing and sintering which comprises providing a component of refractory hard metal and sintering powdered metal in contact with a refractory hard metal component. In various embodiments of the invention, the powdered metal may be pressed into contact with the refractory hard metal component or may be pre-pressed into a shape compatible with the component; either conforming to its dimensions or of a nature which would permit machining to close tolerances, and thereafter heating the assembly to sintering temperature to affect metallurgical bonding of the pressed metal to the refractory hard metal.

The refractory hard metal component may be manufactured by conventional means which normally includes pressing and sintering. Frequently a metal binder is employed in the manufacture of the refractory hard metal components and, when present, the metal binder further facilitates the metallurgical bond between the sintered compact and the refractory hard metal surface. Typical binders employed in manufacturing refractory hard metal articles such as tungsten carbide are cobalt, nickel, and iron. Bonds resulting between the refractory hard metal component and the sintered metal are actually much stronger than a brazed joint when a metal binder is present.

In general, the sequence that is followed in manufacturing composite articles in accordance with the invention is as follows:

(1) A refractory hard metal component is provided. The component may be manufactured by conventional techniques such as normally employed, for example, in making tungsten carbide parts.

(2) Metal powder, for example, cast iron, stainless steel, nickel, etc., is compacted to form a shape compatible with the refractory hard metal component. If necessary, the compacted metal powder may be machined to the required dimensions.

(3) In some cases a refractory hard metal component can be placed in or contained within the mold in which the metal powder is being compacted. Various compacting pressures can be used. From 5 to 100 tons per square inch have been employed satisfactorily.

(4) The compacted parts along with the refractory hard metal component is placed in a controlled atmosphere furnace and the temperature is adjusted to sinter the powdered metal. Usually this temperature is lower than the sintering temperature of the refractory hard metal components; however, it need not be. It is at this point that any metal binder component of the refractory hard metal may be used to advantage in facilitating the metallurgical bond between the refractory hard metal and the powdered metal.

The size of the compacted powder may be controlled from practically no size change to as high as a ten percent change in dimension. This is accomplished primarily by adjusting the compacting pressure. Other parameters that may be controlled are the composition of the alloy or alloys used in the powdered metal compact and the sintering conditions, i.e., temperature and time.

As an illustration of a practice of a presently preferred embodiment of the invention, a cast iron tire stud body is manufactured as follows:

Cast iron powder minus 325 mesh is compacted along with a sintered tungsten carbide pin in a die. A compacting pressure of 30 tons per square inch is used to form a green powder metal compact about the refractory hard metal component. The compacted assembly is placed in a controlled atmosphere furnace in which hydrogen was used as a sintering atmosphere. A pre-sintering cycle of heating to 700° C. for one-half hour was employed because volatilizable binder of 2 percent wax was present. The compact is loaded in a ceramic boat for heating to temperature in the furnace. Where a volatilizable binder is not used, no pre-sintering cycle is necessary.

After pre-sintering, the compact is placed in another induction vacuum furnace back-filled with hydrogen and heated to a temperature of 1350° C. where it is held for one hour. Micrographic analysis of the sintered compact indicates metallurgical bonding at the interface between the pressed powder and the refractory hard metal component. The interface is believed to be a combination of iron tungsten and iron tungsten carbide plus cobalt which was present in the refractory hard metal component as a binder therefor.

It is evident from the foregoing that various changes and modifications may be made in practicing the invention. The composition of the refractory hard metal component or of the powder metal used in forming the composite may be varied depending upon the intended application of the finished article. Both iron powder and powder of iron alloys and steel have been satisfactorily used and form highly desirable finished products. Furthermore, other additives may be included to accomplish particular functions. Thus, for example, in manufacturing tire studs, some copper powder may be added as an anti-rust agent. Careful dimensional control may be achieved by adjustment of the pressing and sintering conditions.

I claim:

1. A method of making a composite article of multiple components wherein one component is a preshaped form and another is a shaped form made of compacted and sintered powdered metal which comprises providing a preshaped form of at least one refractory hard metal selected from the group consisting of carbides, nitrides, silicides and borides of refractory metals, compacting metal powder into a shaped form compatible with said preshaped form, physically assembling the preshaped form and the compacted metal powder form and heating both forms to metallurgically bond said preshaped form and said compacted metal powder form.

2. A method according to claim 1 wherein said refractory hard metal preshaped form comprises tungsten carbide.

3. A method according to claim 1 wherein said refractory hard metal preshaped form comprises titanium carbide.

4. A method according to claim 1 wherein said refractory hard metal preshaped form comprises tantalum carbide.

5. A method according to claim 1 wherein said metal powder comprises metal powder from the group consisting of iron and iron alloys including steels.

6. A method of making a composite article of multiple components wherein one component is a preshaped form and another is a shaped form made of compacted and sintered powdered metal which comprises providing a preshaped form of at least one refractory hard metal from the group consisting of carbides, nitrides, silicides and borides of refractory metals, disposing metal powder into contact with said preshaped form in sufficient quantity to produce after compacting and sintering a shaped metal form compacting said powder and heating to sintering temperature to sinter the powder and metallurgically bond the sintered shaped metal form to said preshaped form.

7. A method according to claim 6 wherein said refractory hard metal preshaped form comprises tungsten carbide.

8. A method according to claim 6 wherein said refractory hard metal preshaped form comprises titanium carbide.

9. A method according to claim 6 wherein said refractory hard metal preshaped form comprises tantalum carbide.

10. A method according to claim 6 wherein said metal powder comprises metal powder from the group consisting of iron and iron alloys including steels.

References Cited

UNITED STATES PATENTS

| 2,899,338 | 8/1959 | Goetzel et al. | 75—208 |
| 2,398,132 | 4/1946 | Cottrell | 75—208 |

CARL D. QUARFORTH, Primary Examiner

B. H. HUNT, Assistant Examiner

U.S. Cl. X.R.

29—182.2, 182.3, 472.9